US012410017B2

(12) United States Patent
Kimura (10) Patent No.: US 12,410,017 B2
(45) Date of Patent: Sep. 9, 2025

(54) COMPUTER SYSTEM, COMPUTER, AND METHOD FOR CONTROLLING CONVEYANCE SYSTEM

(71) Applicant: Hitachi, Ltd., Tokyo (JP)

(72) Inventor: Nobutaka Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 216 days.

(21) Appl. No.: 18/268,776

(22) PCT Filed: Nov. 30, 2021

(86) PCT No.: PCT/JP2021/043997
§ 371 (c)(1),
(2) Date: Jun. 21, 2023

(87) PCT Pub. No.: WO2022/138021
PCT Pub. Date: Jun. 30, 2022

(65) Prior Publication Data
US 2024/0067459 A1 Feb. 29, 2024

(30) Foreign Application Priority Data
Dec. 22, 2020 (JP) ................. 2020-212029

(51) Int. Cl.
*B65G 43/10* (2006.01)
*B65G 43/08* (2006.01)
(52) U.S. Cl.
CPC ............. *B65G 43/10* (2013.01); *B65G 43/08* (2013.01)

(58) Field of Classification Search
CPC ................. B65G 43/10; B65G 43/08
USPC ....................................... 198/460.1
See application file for complete search history.

(56) References Cited

U.S. PATENT DOCUMENTS

| 5,638,938 | A | * | 6/1997 | Lazzarotti | ................. B07C 1/02 |
| | | | | | 198/444 |
| 6,522,944 | B2 | * | 2/2003 | Wielebski | ............. B65G 47/31 |
| | | | | | 700/229 |
| 6,996,454 | B1 | | 2/2006 | Edstrom | |

(Continued)

FOREIGN PATENT DOCUMENTS

| CN | 113631493 | * 11/2021 |
| JP | 2000-344334 A | 12/2000 |

(Continued)

OTHER PUBLICATIONS

Japanese Office Action issued on Dec. 19, 2023 for Japanese Patent Application No. 2020-212029.

(Continued)

*Primary Examiner* — Gene O Crawford
*Assistant Examiner* — Lester Rushin, III
(74) *Attorney, Agent, or Firm* — Volpe Koenig (57) ABSTRACT

A computer system comprising a transportation system and a control system, wherein: the transportation system comprises a plurality of transportation modules having transportation means for transporting articles; the transportation system transmits, for each of the plurality of transportation modules configuring a transportation line, connection information pertaining to connections between transportation modules; and the control system controls the transportation system on the basis of the multiple pieces of connection information.

8 Claims, 9 Drawing Sheets

(56) References Cited

U.S. PATENT DOCUMENTS

| | | | | |
|---|---|---|---|---|
| 2004/0065526 A1* | 4/2004 | Zeitler | .................. | B65G 43/10 |
| | | | | 198/460.1 |
| 2006/0080827 A1 | 4/2006 | Saito et al. | | |
| 2017/0283183 A1* | 10/2017 | Erceg | .................... | B65G 43/02 |

FOREIGN PATENT DOCUMENTS

| | | | |
|---|---|---|---|
| JP | 2002-500996 A | 1/2002 |
| JP | 2011-230881 A | 11/2011 |
| JP | 2019-031386 A | 2/2019 |
| WO | 99/37563 A1 | 7/1999 |
| WO | 2004/108347 A1 | 12/2004 |

OTHER PUBLICATIONS

International Search Report, PCT/JP2021/043997, Feb. 22, 2022, 2 pgs.

* cited by examiner

| TYPE | SHAPE | CONVEYANCE CONTROL | ID RANGE |
|---|---|---|---|
| SHORT STRAIGHT CONVEYOR | LENGTH: a, WIDTH: b, HEIGHT: c, | A→B, B→A | 10001-10020 |
| LONG STRAIGHT CONVEYOR | LENGTH: a, WIDTH: b, HEIGHT: c, | A→B, B→A | 10021-10030 |
| DIVERTING CONVEYOR | LENGTH: a, WIDTH: b, HEIGHT: c, | A→B, B→A A→C, C→A | 10031-10040 |
| ROBOT | LENGTH: f, WIDTH: g, HEIGHT: h, | CONVEYANCE PATTERN A | 10041-10050 |

COMPUTER SYSTEM, COMPUTER, AND METHOD FOR CONTROLLING CONVEYANCE SYSTEM

INCORPORATION BY REFERENCE

This application incorporates by reference the subject matter of Japanese Patent Application No. 2020-212029, filed on Dec. 22, 2020, and claims priority therefrom.

TECHNICAL FIELD

The present invention relates to control of a conveyance system that conveys articles.

BACKGROUND ART

In a conveyance system, articles such as products, parts, and goods are conveyed using a conveyor line formed by connecting devices such as roller conveyors. Techniques for designing and changing the configuration of a conveyor line according to the expansion and changes of business, changes in demand, and the like is attracting attention. For example, a technique described in PTL 1 is known.

PTL 1 describes "a controller capable of controlling a linear conveying device or a right-angle conveying device that forms a part of a roller conveyor device having a motor. The linear conveying device is a device that conveys a conveyance object in a straight direction and is divided into control zones, each of which includes a motor, and the right-angle conveying device is a device that can change a conveying direction of the conveyance object and includes a plurality of motors. The controller includes: a motor control board, the motor control board includes a plurality of motor drive circuits, a rewritable memory in which a rewritable conveyance program that controls the linear conveying device or the right-angle conveying device is stored, and a CPU; and an input/output circuit that can receive signals from a plurality of detection means provided in the linear conveying device and the right-angle conveying device. The controller can create the conveyance program using a program creation support program. The program creation support program allows inputs of the following items: a name item in which a name that is arbitrarily determined by a user is input as a name for a series of operations formed by combining one or a plurality of operations; a condition item in which a condition under which the series of operations input in the name item are executed is input; an operation item in which a specific content of the series of operations is input; and a next process item in which a name described in the name item corresponding to a series of operations that is executed after the series of operations is input. One condition item and one operation item are processed as a set of condition operation sets. The condition operation set is associated with one or a plurality of next process items and one name item to form a program table".

By using the technique described in PTL 1, a user can design a conveyor line using a computer for design, and can construct and run the conveyor line by connecting devices on the basis of the design.

CITATION LIST

Patent Literature

PTL 1: JP 2011-230881 A

SUMMARY OF INVENTION

Technical Problem

In the prior art, it is necessary for a user to manually connect devices such as conveyors forming a conveyor line according to the design. Furthermore, in a case where special control logic needs to be set up, the user needs to check the identification information of the device and manually set up the control logic.

In the prior art, in a case where the design of the conveyor line has been changed on the conveyance system side, there is a problem that the change of the conveyor line is not reflected in the control system. In this case, a discrepancy occurs between the conveyor line on the control system side and the conveyor line on the conveyance system side, and there is a possibility that the entire system does not function correctly.

An object of the present invention is to realize a technique of reflecting information regarding a change in design of a conveyor line constructed in a conveyance system to a control system.

Solution to Problem

A representative example of the invention disclosed in the present application is as follows. That is, a computer system including a conveyance system, and a control system communicably connected to the conveyance system, in which the conveyance system includes a plurality of conveyance modules each having a conveyance means for conveying an article, the control system includes at least one computer having an arithmetic device, a storage device connected to the arithmetic device, and a communication device connected to the arithmetic device, the conveyance system transmits, to the control system, interconnection information regarding connection between the conveyance modules of each of the plurality of conveyance modules forming a conveyor line, and the control system controls the conveyance system on the basis of a plurality of pieces of the interconnection information.

Advantageous Effects of Invention

According to the present invention, it is possible to reflect information regarding a change in design of a conveyor line in a conveyance system to a control system. Problems, configurations, and effects other than those described above will be clarified by the following description of embodiments.

DESCRIPTION OF EMBODIMENTS

Hereinafter, embodiments of the present invention will be described with reference to the drawings. However, the present invention is not to be construed as being limited to the contents of the description of the embodiments described below. Those skilled in the art can easily understand that the specific configuration can be changed without departing from the spirit or gist of the present invention.

In the configurations of the invention described below, the same or similar configurations or functions are denoted by the same reference numerals, and redundant description is omitted.

Notations such as "first", "second", and "third" in the present specification and the like are used to identify constituent elements, and are not necessarily intended to limit the number or order.

In order to facilitate understanding of the invention, the position, size, shape, range, and the like of each configuration illustrated in the drawings and the like may not represent the actual position, size, shape, range, and the like. Therefore, the present invention is not limited to the position, size, shape, range, and the like disclosed in the drawings and the like.

First Embodiment

Figure 1:
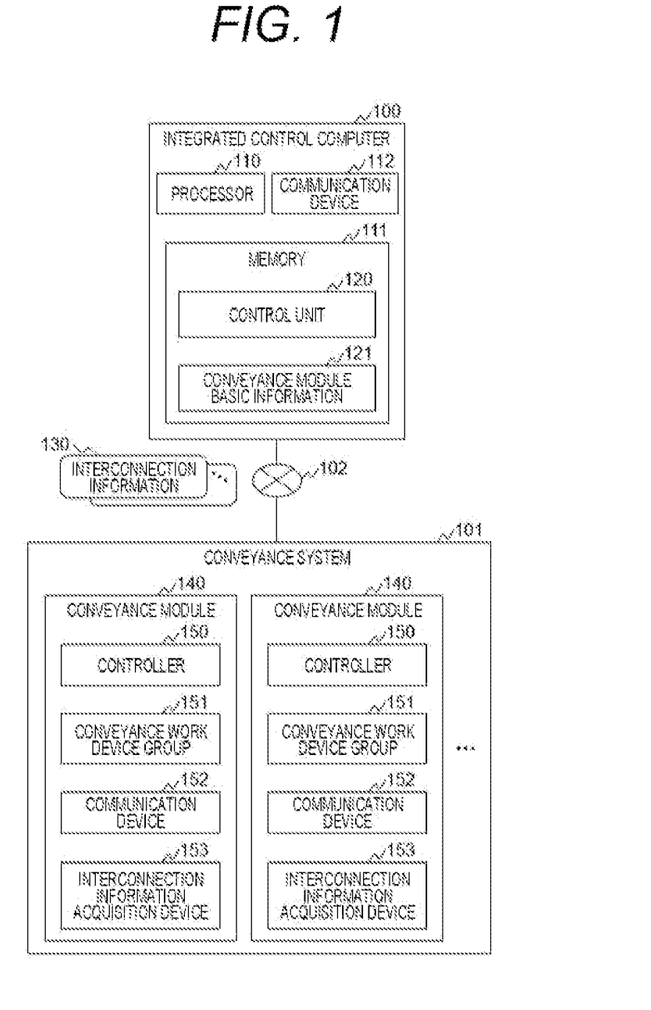
FIG. 1 is a diagram illustrating a configuration example of a system of a first embodiment.

FIG. 1 is a diagram illustrating a configuration example of a system of a first embodiment.

The system is formed of an integrated control computer 100 and a conveyance system 101. The integrated control computer 100 and the conveyance system 101 are connected to each other via a network 102. The network 102 is a wide area network (WAN), a local area network (LAN), or the like, and a connection method may be either wired or wireless.

The conveyance system 101 is formed of a plurality of conveyance modules 140. The conveyance system 101 includes a plurality of kinds of conveyance modules 140 having different conveyance means, shapes, and the like. Note that the conveyance system 101 may include an edge device and the like.

In the conveyance system 101, a conveyor line is constructed using the conveyance modules 140. Articles are conveyed from a start point to a goal point according to a conveyance route on the conveyor line. Here, the conveyance route represents a conveyance order (conveyance plan) of the articles in the conveyor line.

The conveyance module 140 is a device that performs conveyance work of articles, and includes a controller 150, a conveyance work device group 151, a communication device 152, and an interconnection information acquisition device 153.

The controller 150 is a device that controls the entire conveyance module 140, and includes a processor and a memory. The memory stores basic control logic for realizing the basic operation of the conveyance work device group 151.

The conveyance module 140 automatically conveys articles on the basis of the basic control logic after a conveyor line is constructed. Note that in a case where special control logic is set up from the integrated control computer 100, the conveyance module 140 conveys the articles on the basis of the special control logic.

Thus, the conveyance module 140 of the present embodiment can autonomously run on the basis of the basic control logic. Therefore, the integrated control computer 100 does not need to set up the control logic (special control logic) for all the conveyance modules 140 forming the conveyor line. Accordingly, there is an advantage that the calculation cost required for setting up the conveyor line can be reduced. Furthermore, there is an advantage that the amount of communication for setting up the control logic can also be reduced.

The conveyance work device group 151 is a device group for performing conveyance work. The conveyance work device group 151 is, for example, a roller, a belt, a sensor, a motor, a lift, an arm, a tire, and the like. Note that the present invention is not limited to the devices included in the conveyance work device group 151.

The communication device 152 is a device for communicating with other devices.

The interconnection information acquisition device 153 is a device for acquiring interconnection information 130. Here, the interconnection information 130 is information regarding the connection between the conveyance modules 140 forming the conveyor line. A specific data structure of the interconnection information 130 will be described with reference to FIG. 5.

The conveyance module 140 in the first embodiment acquires the interconnection information 130 regarding the connection between the conveyance module 140 itself and other conveyance modules 140 using the interconnection information acquisition device 153. Furthermore, the conveyance module 140 transmits the interconnection information 130 to the integrated control computer 100 using the communication device 152.

Note that a device included in the conveyance work device group 151 may function as the interconnection information acquisition device 153.

The integrated control computer 100 is a computer that controls the conveyance system 101, and includes a processor 110, a memory 111, and a communication device 112. Note that the integrated control computer 100 may include a storage device such as a hard disk drive (HDD) or a solid state drive (SSD), may include an input device such as a keyboard, a mouse, or a touch panel, and may include an output device such as a display.

The processor 110 executes a program stored in the memory 111. The processor 110 operates as a functional unit that realizes a specific function by executing processing according to the program. In the following description, in cases where processing is described using a functional unit as a subject, it indicates that the processor 110 executes the program that realizes the functional unit. The memory 111 stores the program executed by the processor 110 and information used by the program. Furthermore, the memory 111 is also used as a work area. The communication device 112 is a device for communicating with other devices.

The memory 111 in the first embodiment stores a program that realizes a control unit 120, and a conveyance module basic information 121.

The control unit 120 performs multiple kinds of controls such as generation of conveyor line model information for managing a constitution of a conveyor line, generation of a conveyance route, and setting up of control logic.

The conveyance module basic information 121 is information for managing structures and the like of various types of conveyance modules 140. A specific data structure of the conveyance module basic information 121 will be described with reference to FIG. 4.

Note that a system that realizes the functions included in the integrated control computer 100 may be configured using a plurality of computers.

Figure 2A:
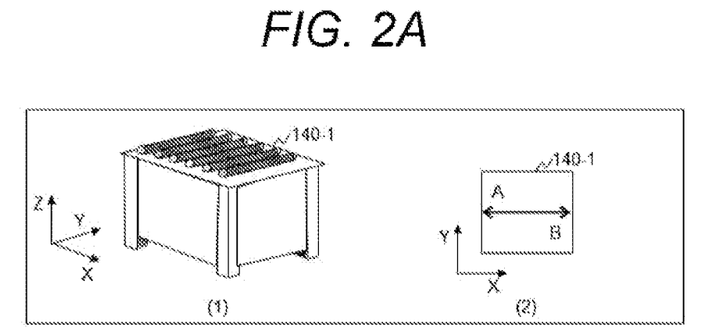
FIG. 2A is a diagram illustrating an example of a conveyance module in the first embodiment.
Figure 2B:
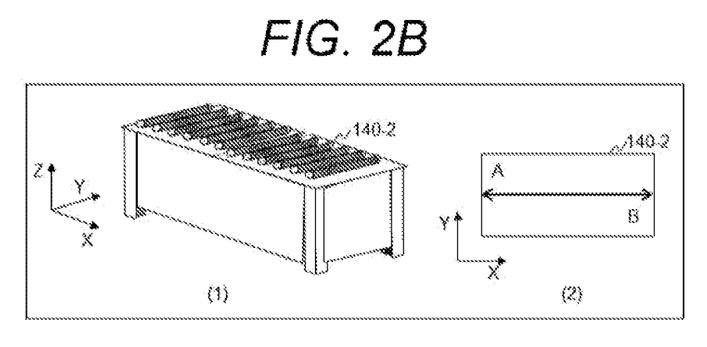
FIG. 2B is a diagram illustrating an example of a conveyance module in the first embodiment.
Figure 2C:
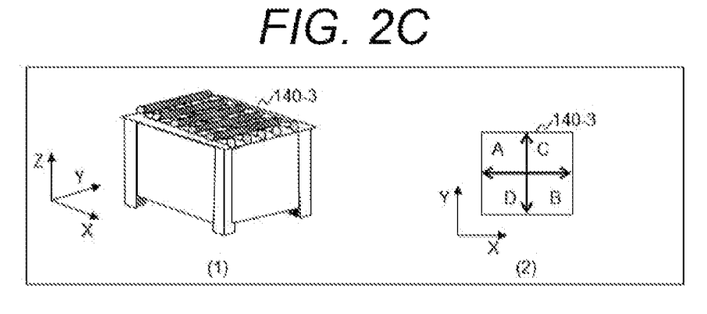
FIG. 2C is a diagram illustrating an example of a conveyance module in the first embodiment.

FIGS. 2A, 2B, and 2C are diagrams illustrating examples of the conveyance modules 140 in the first embodiment.

A conveyance module 140-1 illustrated in FIG. 2A is a short straight conveyor. The view (1) in FIG. 2A is a perspective view of the conveyance module 140-1, and the view (2) in FIG. 2A is a top view of the conveyance module 140-1. Note that axes illustrated in the perspective view and the top view are provided for description.

The conveyance module 140-1 includes a conveyance means that conveys articles from either of two directions (direction A or B) to either of two directions. Note that the directions A and B are uniquely determined with respect to the conveyance module 140-1.

A conveyance module 140-2 illustrated in FIG. 2B is a long straight conveyor. The view (1) in FIG. 2B is a perspective view of the conveyance module 140-2, and the view (2) in FIG. 2B is a top view of the conveyance module 140-2. Note that axes illustrated in the perspective view and the top view are provided for description.

The conveyance module 140-2 includes a conveyance means that conveys articles from either of two directions (direction A or B) to either of two directions. Note that the directions A and B are uniquely determined with respect to the conveyance module 140-2.

A conveyance module 140-3 illustrated in FIG. 2C is a diverting conveyor. The view (1) in FIG. 2C is a perspective view of the conveyance module 140-3, and the view (2) in FIG. 2C is a top view of the conveyance module 140-3. Note that axes illustrated in the perspective view and the top view are provided for description.

The conveyance module 140-3 includes a conveyance means that conveys articles from any of four directions (directions A, B, C, and D) to any of four directions. Note that the s A, B, C, and D are uniquely determined with respect to the conveyance module 140-3.

Note that the conveyance modules 140 illustrated in FIGS. 2A, 2B, and 2C are examples, and the present invention is not limited thereto. The conveyance modules 140 also include a conveyor (level changer) that conveys articles up and down, a picking robot that performs picking work, and the like.

Figure 3A:
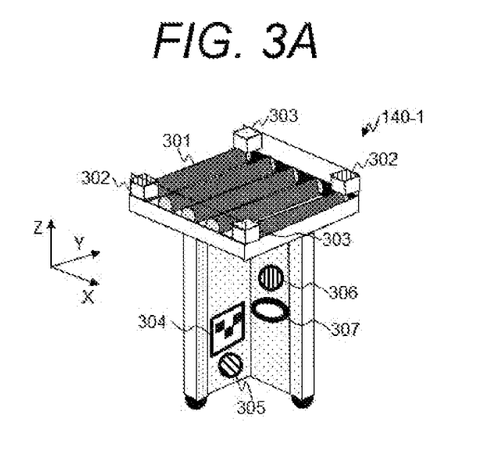
FIG. 3A is a diagram illustrating a specific structure of the conveyance module in the first embodiment.
Figure 3B:
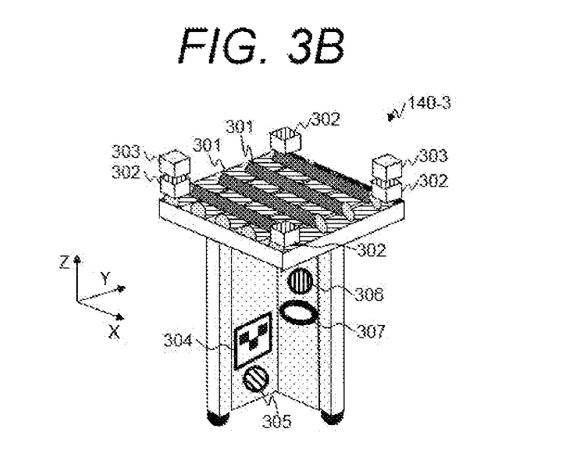
FIG. 3B is a diagram illustrating a specific structure of the conveyance module in the first embodiment.
Figure 3C:
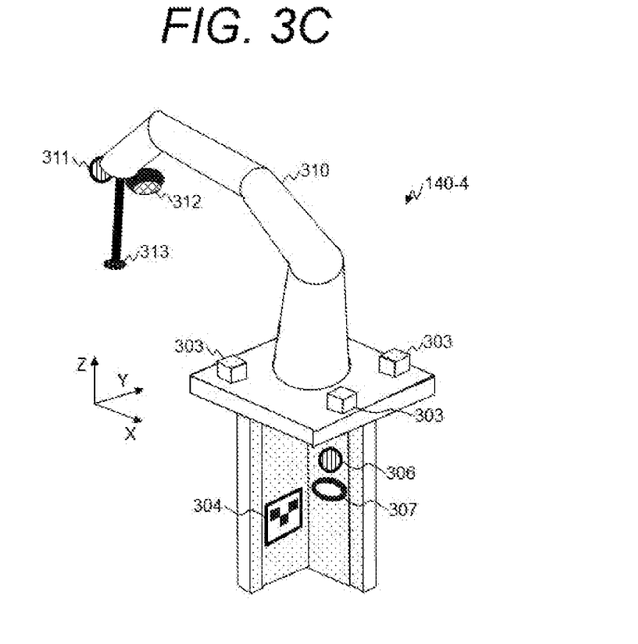
FIG. 3C is a diagram illustrating a specific structure of a conveyance module in the first embodiment.

FIGS. 3A, 3B, and 3C are diagrams illustrating specific structures of the conveyance modules 140 in the first embodiment.

FIG. 3A is a perspective view illustrating a specific structure of the conveyance module 140-1 (short straight conveyor). Note that axes illustrated in the perspective view are provided for description.

The conveyance module 140-1 includes rollers 301, presence sensors 302, barcode readers 303, ID markers 304, a presence indicator LED 305, a light 306, and a camera 307.

The rollers 301 rotate in a constant direction to convey articles. The article may be conveyed while accommodated in a tray. In this case, two or more articles may be accommodated in one tray.

The presence sensors 302 measure the presence or absence of an article on the conveyance module 140-1. The presence indicator LED 305 outputs a signal indicating the presence or absence of an article on the conveyance module 140-1 on the basis of measurement results of the presence sensors 302. For example, in a case where there is an article on the conveyance module 140-1, the presence indicator LED 305 turns on, and in a case where there is no article on the conveyance module 140-1, the presence indicator LED 305 turns off.

The barcode readers 303 read a barcode attached to an article or a tray. The barcode is attached to identify a conveyance destination, a type of article, and the like.

The ID markers 304 are markers indicating identification information and a direction of the conveyance module 140. The ID marker 304 is attached to the conveyance module 140-1 in each of the directions A and B.

The light 306 is used for the camera 307 to acquire a clear image. The camera 307 reads the ID marker 304 and a signal of the presence indicator LED 305 of another conveyance module 140.

The roller 301, the presence sensor 302, the barcode reader 303, the presence indicator LED 305, and the camera 307 are examples of the conveyance work device group 151. The camera 307 is an example of the interconnection information acquisition device 153.

For example, the following basic control logic is set up in the conveyance module 140-1. In a case where there is no article on the own-conveyance module 140-1, the conveyance module 140-1 receives an article that is conveyed from an arbitrary direction, and in a case where the presence indicator LED 305 of the conveyance module 140 connected to the conveyance module 140-1 is off, the conveyance module 140-1 conveys the article to the conveyance module 140.

FIG. 3B is a perspective view illustrating a specific structure of the conveyance module 140-3 (diverting conveyor). Note that axes illustrated in the perspective view are provided for description.

The conveyance module 140-3 includes rollers 301, presence sensors 302, barcode readers 303, ID markers 304, a presence indicator LED 305, lights 306, and cameras 307.

The conveyance module 140-3 includes rollers 301 having different rotation directions. Furthermore, the ID marker 304 is attached to the conveyance module 140-3 in each of the directions A, B, C, and D. Furthermore, the conveyance module 140-3 includes the light 306 and the camera 307 in each of the four directions. Other configurations are the same as those of the conveyance module 140-1.

For example, the following basic control logic is set up in the conveyance module 140-3. In a case where there is no article on the own-conveyance module 140-3, the conveyance module 140-3 receives an article that is conveyed from an arbitrary direction, and in a case where the presence indicator LED 305 of the conveyance module 140 connected to the conveyance module 140-3 is off, the conveyance module 140-3 conveys the article to the conveyance module 140.

FIG. 3C is a perspective view illustrating a specific structure of a conveyance module 140-4 (picking robot). The conveyance module 140-4 is a robot that performs picking work for articles. Note that axes illustrated in the perspective view are provided for description.

The conveyance module 140-4 includes barcode readers 303, ID markers 304, lights 306, cameras 307, a hand 310, a light 311, an RGBD camera 312, and a sucker 313.

The hand 310 moves in various directions for performing picking work. The light 311 is used for the RGBD camera 312 to acquire a clear image. The RGBD camera 312 identifies a good on another conveyance module 140 adjacent to the conveyance module 140-4. The sucker 313 holds an article.

The ID marker 304 is attached to the conveyance module 140-4 in each of the four directions. Furthermore, the conveyance module 140-4 includes the presence indicator LED 305, the light 306, and the camera 307 in each direction. Other configurations are the same as those of the conveyance module 140-1.

For example, the following basic control logic is set up in the conveyance module 140-4. In a case where the presence indicator LED 305 of the conveyance module 140 connected to the conveyance module 140-4 is on, the conveyance module 140-4 moves the hand 310 to hold the article.

In the first embodiment, the conveyance module 140 acquires interconnection information by capturing the ID marker 304 by using the camera 307.

However, the method of acquiring the interconnection information by the conveyance module 140 is an example, and the present invention is not limited thereto. For example, an ID and the like may be notified between the conveyance modules 140 using infrared communication. Furthermore, conveyance module 140 may include an RFID tag and a reader and acquire the interconnection information by reading the RFID tag by the reader. Furthermore, the connection direction may be identified by providing wiring on frames of the conveyance module 140 and connecting or short-circuiting the frames by bringing the frames into contact with each other.

Figure 4:
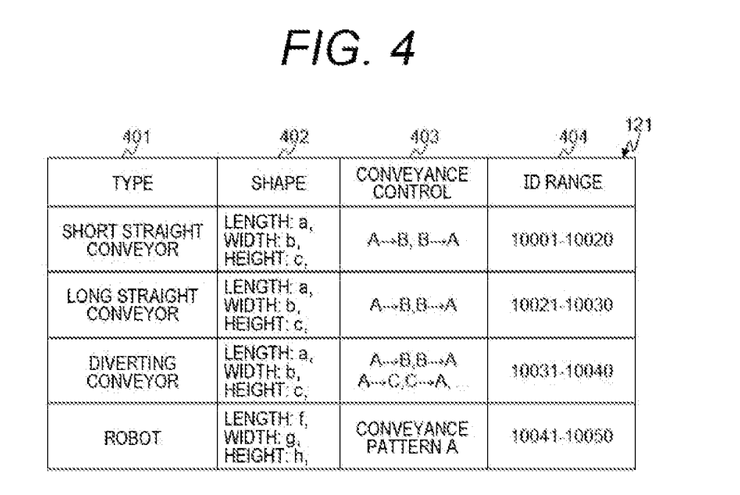
FIG. 4 is a table illustrating an example of a data structure of conveyance module basic information in the first embodiment.

FIG. 4 is a table illustrating an example of a data structure of the conveyance module basic information 121 in the first embodiment.

The conveyance module basic information 121 stores entries formed of type 401, shape 402, conveyance control 403, and ID range 404. One entry corresponds to one kind of the conveyance module 140. Note that the fields included in the entry are examples, and the present invention is not limited thereto.

The type 401 is a field that stores values indicating the type of the conveyance module 140. For example, the model number, the name, and the like of the conveyance module 140 are stored.

The shape 402 is a field that stores values regarding the shape of the conveyance module 140. For example, values indicating the size and the like of the conveyance module 140 are stored.

The conveyance control 403 is a field that stores values regarding a basic conveyance method of an article. For example, values indicating the conveying direction are stored.

The ID range 404 is a field that stores ranges of the IDs assigned to the same kind of conveyance module 140.

Figure 5:
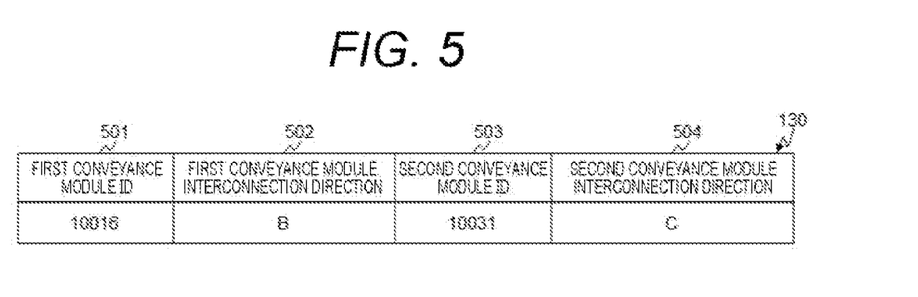
FIG. 5 is a table illustrating an example of a data structure of interconnection information in the first embodiment.

FIG. 5 is a table illustrating an example of a data structure of the interconnection information 130 in the first embodiment.

The interconnection information 130 is formed of first conveyance module ID 501, first conveyance module interconnection direction 502, second conveyance module ID 503, and second conveyance module interconnection direction 504.

The first conveyance module ID 501 is a field that stores an ID of a first conveyance module 140. In the first embodiment, the ID of the own-conveyance module 140 is stored in the first conveyance module ID 501. Here, the own-conveyance module 140 represents the conveyance module 140 that generates the interconnection information 130.

The first conveyance module interconnection direction 502 is a field that stores a value indicating a connection direction of a second conveyance module 140 to the first conveyance module 140. In the first embodiment, a value indicating the connection direction of another conveyance module 140 to the own-conveyance module 140 is stored in the first conveyance module interconnection direction 502. Here, the another conveyance module 140 represents the conveyance module 140 connected to the own-conveyance module 140.

The second conveyance module ID 503 is a field that stores an ID of the second conveyance module 140. In the first embodiment, the ID of the another conveyance module 140 is stored in the second conveyance module ID 503.

The second conveyance module interconnection direction 504 is a field that stores a value indicating a connection direction of the first conveyance module 140 to the second conveyance module 140. In the first embodiment, a value indicating the connection direction of the own-conveyance module 140 to the another conveyance module 140 is stored in the second conveyance module interconnection direction 504.

In a case where two other conveyance modules 140 are connected to the own-conveyance module 140, the own-conveyance module 140 generates the interconnection information 130 for each connection and transmits the interconnection information 130 to the integrated control computer 100.

Figure 6:
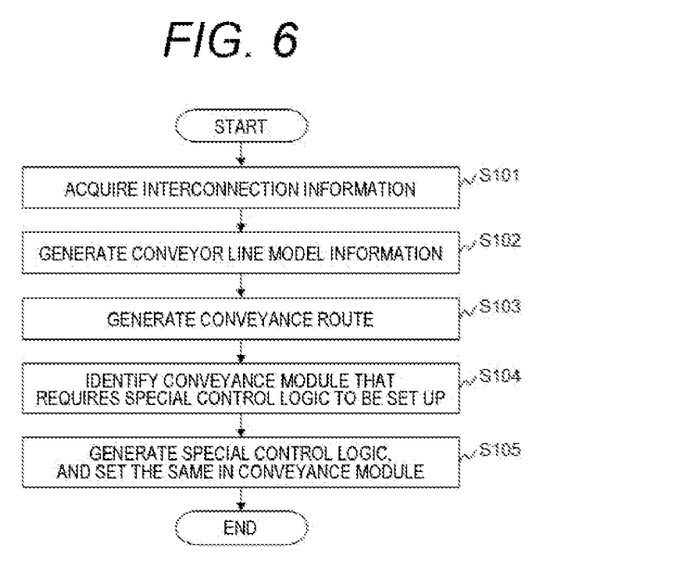
FIG. 6 is a flowchart describing an example of processing executed by an integrated control computer in the first embodiment.
Figure 7:
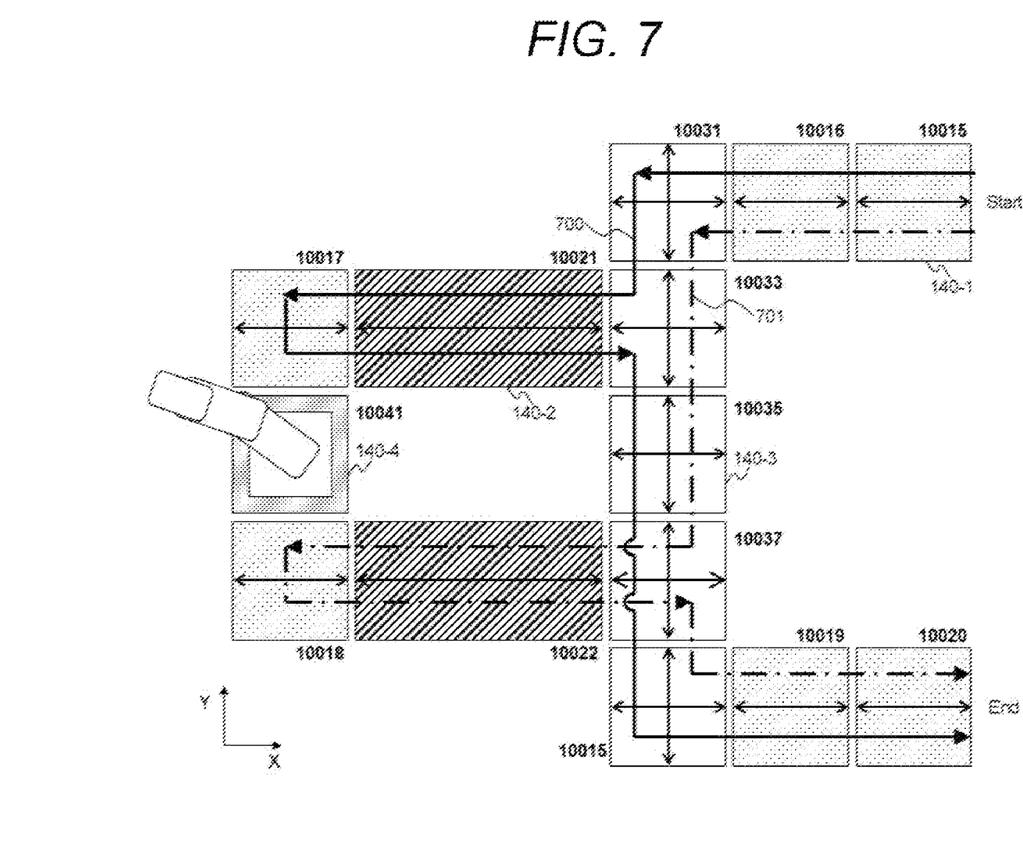
FIG. 7 is a diagram illustrating an example of a conveyor line constructed in a conveyance system in the first embodiment.

FIG. 6 is a flowchart describing an example of processing executed by the integrated control computer 100 in the first embodiment. FIG. 7 is a diagram illustrating an example of a conveyor line constructed in the conveyance system 101 in the first embodiment.

The integrated control computer 100 acquires the interconnection information 130 from the conveyance system 101 (step S101). In the first embodiment, each conveyance module 140 transmits the interconnection information 130. The integrated control computer 100 stores the received interconnection information 130 in the memory 111.

Next, the integrated control computer 100 generates conveyor line model information using the conveyance module basic information 121 and the received interconnection information 130 (step S102).

The conveyor line model information is information for managing the constitution of the conveyor line constructed in the conveyance system 101. The conveyor line model information includes, for example, data indicating a connection relationship of the conveyance modules 140 forming the conveyor line. The integrated control computer 100 can display a diagram as illustrated in FIG. 7 on the basis of the conveyor line model information. Note that the conveyor line model information may not be generated.

In FIG. 7, bold numerical values on the conveyance modules 140 indicate IDs. Conveyance routes 700 and 701 indicate conveyance routes set up on the conveyor line. Here, the conveyance route 700 is a conveyance route for conveying articles of company A, and the conveyance route 701 is a conveyance route for conveying articles of company B.

Next, the integrated control computer 100 generates conveyance routes (conveyance plan) on the conveyor line (step S103).

It is assumed that the integrated control computer 100 has received information about points such as a start point, an end point, and a relay point of the conveyor line, and information regarding the type and the like of the articles conveyed using the conveyor line in advance. The start point, the end point, the relay point, and the like of the conveyor line are designated using identification information and the directions of the conveyance modules 140. In FIG. 7, "10015, B", "10020, A", and "10017, A" are input as a start point, an end point, and a relay point of the conveyance route 700, and "10015, B", "10020, A", and "10018, A" are input as a start point, an end point, and a relay point of the conveyance route 701.

The integrated control computer 100 generates conveyance routes connecting the input points on the basis of a known route search algorithm such as Dijkstra's algorithm. Note that the present invention is not limited to the method of searching for conveyance routes. Note that two or more conveyance routes may be generated on one conveyor line.

Next, the integrated control computer 100 identifies the conveyance module 140 that requires the special control logic to be set up (step S104).

For example, the integrated control computer 100 identifies the conveyance module 140 that meets any of the following conditions.

(1) The conveyance module 140 has a route set up to convey an article after receiving the article and stopping for a certain period. This is because it is necessary to set up special control logic for conveying the article in a case where predetermined conditions are met after the conveyance module 140 receives the article and stops for a certain period.

(2) The conveyance module 140 has two or more routes set up having different conveyance destinations for articles received from the same direction. This is because it is necessary to set up special control logic that controls which article is conveyed at which timing and in which direction.

The conveyance modules 140-1 with ID "10017" and "10018" illustrated in FIG. 7 satisfy condition (1) because they each have a route set up to convey the article after receiving the article and stopping for a certain period. The conveyance modules 140-3 with ID "10033" and "10037" satisfy condition (2) because they each have two routes set up having different conveyance destinations.

Note that the above conditions are examples, and the present invention is not limited thereto. It is sufficient that the conditions can identify the conveyance module 140 that is difficult to control by the basic control logic.

Next, the integrated control computer 100 generates special control logic to be set up in the identified conveyance module 140, and sets up the special control logic in the conveyance module 140 (step S105).

In the case of the conveyance routes illustrated in FIG. 7, special control logic for performing the following control is generated for the conveyance module 140-1 with ID "10017".

(1) Receive an article and stop.
(2) In a case where a certain period of time has elapsed or a predetermined condition is satisfied, convey the article in the same direction as the direction in which the conveyance module 140-1 with ID "10017" has received the article.

As in the case of the conveyance routes illustrated in FIG. 7, special control logic for performing the following control is generated for the conveyance module 140-3 with ID "10033".

(1) In a case where the conveyance module 140-3 with ID "10033" has received an article of the company A from a conveyance module 140-3 with ID "10031", convey the article to a conveyance module 140-2 with ID "10021".
(2) In a case where the conveyance module 140-3 with ID "10033" has received an article of the company B from the conveyance module 140-3 with ID "10031", convey the article to a conveyance module 140-3 with ID "10035".
(3) Do not receive an article of the company A until the conveyance module 140-3 with ID "10033" receives the article from the conveyance module 140-2 with ID "10021". Receive an article of the company B.
(4) In a case where the conveyance module 140-3 with ID "10033" has received the article from the conveyance module 140-2 with ID "10021", convey the article to the conveyance module 140-3 with ID "10035".

According to the first embodiment, the conveyance module 140 can transmit the interconnection information 130 indicating the connection relationship between the own-conveyance module 140 and other conveyance modules 140 to the integrated control computer 100. As a result, the integrated control computer 100 can grasp the conveyor line constructed in the conveyance system 101. Furthermore, the integrated control computer 100 can automatically perform generation of conveyor line model information, generation of a conveyance route, setting up of special control logic, and the like on the basis of the interconnection information 130 received from the conveyance system 101.

Second Embodiment

In the second embodiment, a conveyance vehicle that autonomously travels is included as the conveyance module 140. Hereinafter, the second embodiment will be described focusing on a difference from the first embodiment.

The configuration of a system in the second embodiment is the same as the configuration in the first embodiment. The configuration of the integrated control computer 100 in the second embodiment is the same as the configuration in the first embodiment. The configuration of the conveyance system 101 in the second embodiment is the same as that in the first embodiment, but a conveyance vehicle is included as a conveyance module 140-5. The conveyance vehicle receives an article, autonomously travels to move to a target conveyance module 140, and conveys the article to the conveyance module 140.

The data structure of the conveyance module basic information 121 in the second embodiment is the same as the data structure in the first embodiment. The data structure of the interconnection information 130 in the second embodiment is the same as the data structure in the first embodiment.

The conveyance modules 140-1, 140-2, 140-3, and 140-4 in the second embodiment do not include the interconnection information acquisition device 153. On the other hand, the conveyance vehicle (conveyance module 140-5) includes the interconnection information acquisition device 153.

Structures of the conveyance modules 140-1, 140-2, 140-3, and 140-4 in the second embodiment are the same as those structures of the conveyance modules in the first embodiment. However, in the second embodiment, the camera 307 is not used for reading the ID marker 304.

Figure 8:
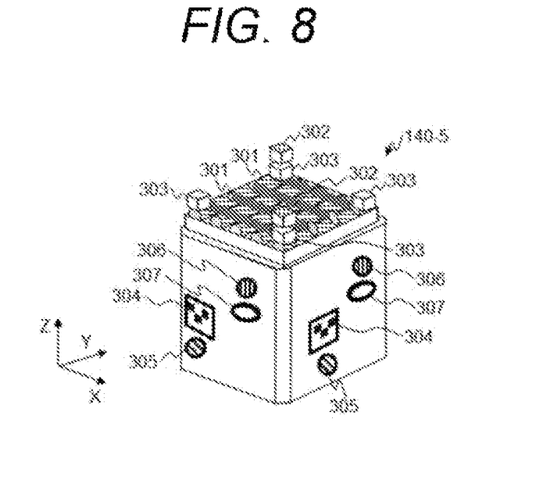
FIG. 8 is a diagram illustrating a specific structure of a conveyance module of a second embodiment.

FIG. 8 is a diagram illustrating a specific structure of the conveyance module 140-5 in the second embodiment.

The conveyance module 140-5 includes rollers 301, presence sensors 302, barcode readers 303, ID markers 304, presence indicator LEDs 305, lights 306, and cameras 307. Furthermore, the conveyance module 140-5 includes a distance sensor and a tire for autonomous traveling (not illustrated).

The conveyance module 140-5 includes rollers 301 having different rotation directions. Furthermore, the ID marker 304 is attached to the conveyance module 140-5 in each of the directions A, B, C, and D. Furthermore, the conveyance module 140-5 includes the presence indicator LED 305, the light 306, and the camera 307 in each of the four directions. Other configurations are the same as those of the conveyance module 140-1.

The controller 150 of the conveyance module 140-5 stores map information of the movement space. The conveyance module 140-5 travels in the movement space while estimating its own position on the basis of the map information and a measurement result of the distance sensor. The conveyance module 140-5 may randomly travel in the movement space, or may travel in the movement space on the basis of a preset policy.

The conveyance module 140-5 uses the cameras 307 to read the ID markers 304 attached to the conveyance modules 140 forming the conveyor line while traveling, and generates the interconnection information 130. At this time of operation, the conveyance module 140-5 determines one of the conveyance modules 140 connected as a first conveyance module. For example, the first conveyance module is determined according to the traveling direction. The conveyance module 140-5 transmits the interconnection information 130 to the integrated control computer 100.

The processing executed by the integrated control computer 100 in the second embodiment is the same as that in the first embodiment. However, in the second embodiment, a large-scale conveyor line formed of independent conveyor lines can be constructed by using the conveyance module 140-5. The conveyance of the article between the independent conveyor lines is performed by the conveyance module 140-5.

Figure 9:
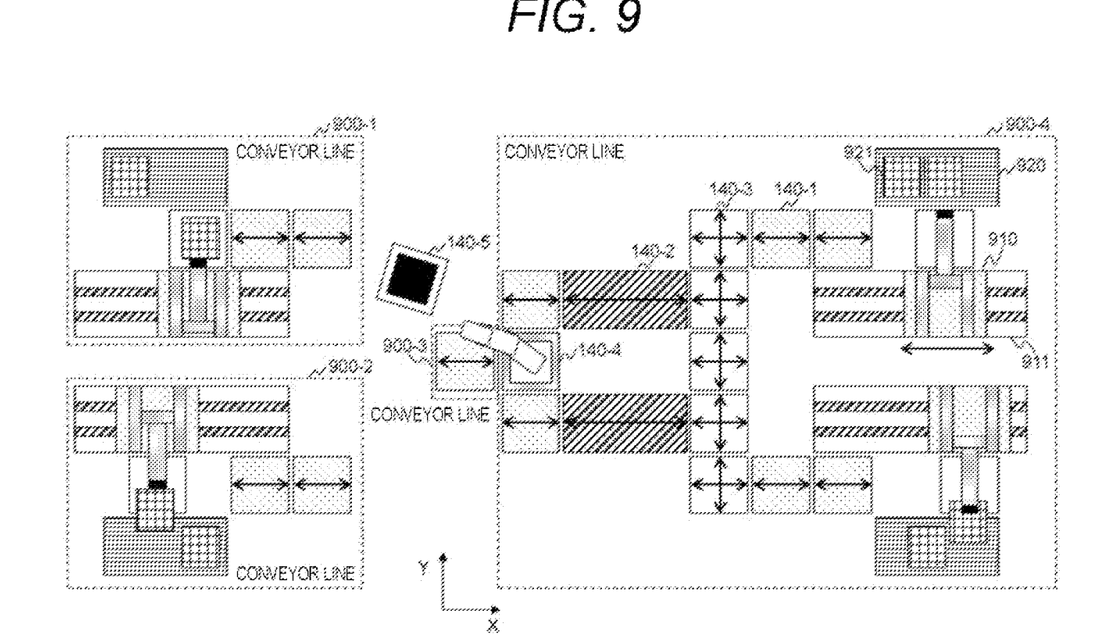
FIG. 9 is a diagram illustrating an example of a conveyor line constructed in a conveyance system in the second embodiment.

FIG. 9 is a diagram illustrating an example of a conveyor line constructed in the conveyance system 101 in the second embodiment.

The conveyor line illustrated in FIG. 9 is formed of four conveyor lines 900-1, 900-2, 900-3, and 900-4. Note that the conveyor line 900-3 is a conveyor line constructed by one conveyance module 140-1.

The conveyor lines 900-1, 900-2, and 900-4 include robots 910 that are movable along rails of pedestals 911. The robot 910 takes out cases 921 from a shelf 920, or accommodates the cases 921 in the shelf 920. The conveyance module 140-5 conveys the cases 921 between the conveyor lines 900-1, 900-2, and 900-3. The conveyance module 140-5 is not treated as the conveyance module 140 forming a conveyor line.

The conveyor line illustrated in FIG. 9 is a conveyor line constructed for performing a sorting work of articles. For example, in the conveyor lines 900-1 and 900-2, the cases 921 with articles accommodated therein are taken out from the shelves 920, and the cases 921 are conveyed to the conveyor line 900-3 by the conveyance module 140-5. The conveyance module 140-4 connected to the conveyance module 140-1 of the conveyor line 900-3 distributes the cases 921 to conveyance routes set up on the conveyor line, and the robots 910 hold the cases 921 that have arrived at end points of the conveyance routes and accommodate the cases 921 in the shelves 920.

Note that control logic is set up in each robot 910 in advance. Furthermore, special control logic is set up in the conveyance module 140-5.

Figure 10:
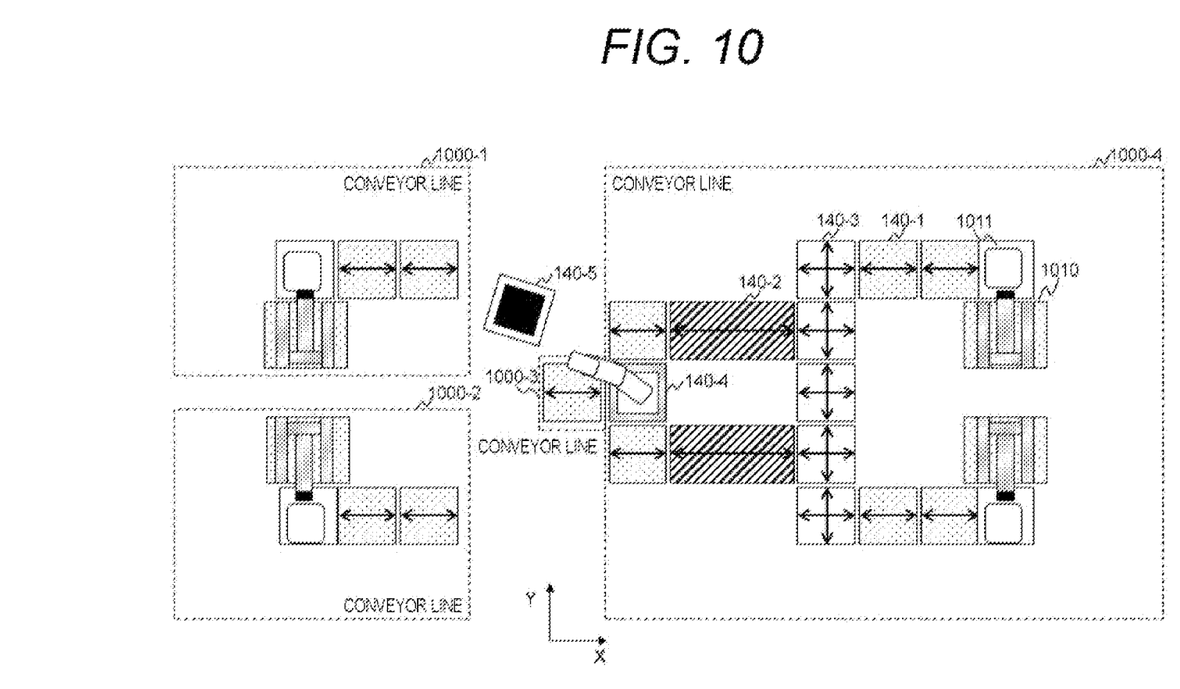
FIG. 10 is a diagram illustrating an example of a conveyor line constructed in the conveyance system in the second embodiment.

FIG. 10 is a diagram illustrating an example of a conveyor line constructed in the conveyance system 101 in the second embodiment.

The conveyor line illustrated in FIG. 10 is formed of four conveyor lines 1000-1, 1000-2, 1000-3, and 1000-4. Note that the conveyor line 1000-3 is a conveyor line constructed by one conveyance module 140-1.

The conveyor lines 1000-1, 1000-2, and 1000-4 include manufacturing robots 1010. The robot 1010 is a robot that manufactures articles such as processing, welding, and assembly of articles 1011. The conveyance module 140-5 conveys the manufactured articles between the conveyor lines 1000-1, 1000-2, and 1000-3. The conveyance module 140-5 is not treated as the conveyance module 140 forming a conveyor line.

The conveyor line illustrated in FIG. 10 is a conveyor line constructed for performing a manufacturing operation of articles. For example, in the conveyor lines 1000-1 and 1000-2, work such as processing of the articles 1011 is performed, and the articles are conveyed to the conveyor line 1000-3 by the conveyance module 140-5. The conveyance module 140-4 connected to the conveyance module 140-1 of the conveyor line 1000-3 distributes the articles to conveyance routes set up on the conveyor line, and the robots 1010 perform work such as processing on the articles that have arrived at end points of the conveyance routes.

Note that control logic is set up in each robot 1010 in advance. Furthermore, special control logic is set up in the conveyance module 140-5.

According to the second embodiment, the conveyance module 140-5 can acquire interconnection information 130 by traveling in the movement space in the conveyance system 101, and can transmit the interconnection information 130 to the integrated control computer 100. As a result, the integrated control computer 100 can grasp the conveyor line constructed in the conveyance system 101. Furthermore, the integrated control computer 100 can automatically perform generation of conveyor line model information, generation of a conveyance route, setting up of special control logic, and the like on the basis of the interconnection information 130 received from the conveyance system 101.

Note that the present invention is not limited to the above embodiments, and includes various modifications. Furthermore, for example, the above embodiments are detailed descriptions of the configurations for the purpose of making the present invention easier to understand, and are not necessarily limited to those having all the described configurations. Furthermore, a part of the configuration of each embodiment can be added to, deleted from, or replaced with another configuration.

Furthermore, some or all of the configurations, functions, processing units, processing means, and the like in each configuration described above may be realized by hardware, for example, by designing with an integrated circuit or the like. Furthermore, the present invention can also be realized by a program code of software that realizes the functions of the embodiments. In this case, a storage medium in which a program code is recorded is provided to a computer, and a processor included in the computer reads the program code stored in the storage medium. In this case, the program code itself read from the storage medium realizes the functions of the above-described embodiments, and therefore the program code itself and the storage medium in which the program code is stored form the present invention. As a storage medium for supplying such a program code, for example, a flexible disk, a CD-ROM, a DVD-ROM, a hard disk, a solid state drive (SSD), an optical disk, a magneto-optical disk, a CD-R, a magnetic tape, a non-volatile memory card, a ROM, or the like is used.

Furthermore, the program code that realizes the functions described in the present embodiments can be implemented by, for example, an assembler or a wide range of programs or script languages such as C/C++, perl, Shell, PHP, Python, or Java.

Moreover, the program code of software that realizes the functions of the embodiments is delivered via a network so that the program code may be stored in a storage means such as a hard disk or a memory of a computer or a storage medium such as a CD-RW or a CD-R, and the processor included in the computer may read and execute the program code stored in the storage means or the storage medium.

In the above embodiments, control lines and information lines considered to be necessary for description are illustrated, but all the control lines and the information lines are not necessarily illustrated in products. All the constituents may be connected to each other.

The invention claimed is:

1. A computer system comprising a conveyance system, and a control system communicably connected to the conveyance system, wherein
the conveyance system includes a plurality of conveyance modules each having a conveyance means for conveying an article,
the control system includes at least one computer having an arithmetic device, a storage device connected to the arithmetic device, and a communication device connected to the arithmetic device,
the conveyance system transmits, to the control system, interconnection information regarding connection between the conveyance modules of each of the plurality of conveyance modules forming a conveyor line, and
the control system controls the conveyance system on a basis of a plurality of pieces of the interconnection information,
wherein
the interconnection information includes identification information of a first conveyance module, identification information of a second conveyance module connected to the first conveyance module, a connection direction of the second conveyance module to the first conveyance module, and a connection direction of the first conveyance module to the second conveyance module, and
wherein the control system
holds conveyance module basic information for managing a structure of the plurality of conveyance modules, and
generates conveyor line model information for managing a structure of the conveyor line constructed in the conveyance system using the conveyance module basic information and the plurality of pieces of interconnection information.

2. A computer system comprising a conveyance system, and a control system communicably connected to the conveyance system, wherein
the conveyance system includes a plurality of conveyance modules each having a conveyance means for conveying an article,
the control system includes at least one computer having an arithmetic device, a storage device connected to the arithmetic device, and a communication device connected to the arithmetic device,
the conveyance system transmits, to the control system, interconnection information regarding connection between the conveyance modules of each of the plurality of conveyance modules forming a conveyor line, and
the control system controls the conveyance system on a basis of a plurality of pieces of the interconnection information,
wherein
the interconnection information includes identification information of a first conveyance module, identification information of a second conveyance module connected to the first conveyance module, a connection direction of the second conveyance module to the first conveyance module, and a connection direction of the first conveyance module to the second conveyance module, and
wherein
the control system
holds conveyance module basic information for managing a structure of the plurality of conveyance modules, and
generates a conveyance route in the conveyor line constructed in the conveyance system using the conveyance module basic information and the plurality of pieces of interconnection information.

3. The computer system according to claim 2, wherein
basic control logic that defines a basic control method of the conveyance means is set up in each of the plurality of conveyance modules,
the control system
identifies at least one of the conveyance module that requires additional control logic to be set up in addition to the basic control logic on a basis of the conveyance route among the plurality of conveyance modules,
generates special control logic to be set up in the conveyance module identified, and
sets up the special control logic in the identified conveyance module.

4. A computer system comprising a conveyance system, and a control system communicably connected to the conveyance system, wherein
the conveyance system includes a plurality of conveyance modules each having a conveyance means for conveying an article,
the control system includes at least one computer having an arithmetic device, a storage device connected to the arithmetic device, and a communication device connected to the arithmetic device,
the conveyance system transmits, to the control system, interconnection information regarding connection between the conveyance modules of each of the plurality of conveyance modules forming a conveyor line, and the control system controls the conveyance system on a basis of a plurality of pieces of the interconnection information, wherein the interconnection information includes identification information of a first conveyance module, identification information of a second conveyance module connected to the first conveyance module, a connection direction of the second conveyance module to the first conveyance module, and a connection direction of the first conveyance module to the second conveyance module, and wherein each of the plurality of conveyance modules includes an acquisition means that acquires the interconnection information, acquires the interconnection information in which the first conveyance module is set as an own-conveyance module using the acquisition means, and transmits the interconnection information to the control system.

5. A computer system comprising a conveyance system, and a control system communicably connected to the conveyance system, wherein the conveyance system includes a plurality of conveyance modules each having a conveyance means for conveying an article, the control system includes at least one computer having an arithmetic device, a storage device connected to the arithmetic device, and a communication device connected to the arithmetic device, the conveyance system transmits, to the control system, interconnection information regarding connection between the conveyance modules of each of the plurality of conveyance modules forming a conveyor line, and the control system controls the conveyance system on a basis of a plurality of pieces of the interconnection information, wherein the interconnection information includes identification information of a first conveyance module, identification information of a second conveyance module connected to the first conveyance module, a connection direction of the second conveyance module to the first conveyance module, and a connection direction of the first conveyance module to the second conveyance module, and wherein the plurality of conveyance modules include a moving conveyance module that can autonomously travel between the conveyance modules forming the conveyor line for conveying the article, the moving conveyance module includes an acquisition means that acquires the interconnection information, travels in a space in which the plurality of conveyance modules are arranged and acquires the interconnection information of each of the plurality of conveyance modules using the acquisition means, and transmits the interconnection information of each of the plurality of conveyance modules to the control system.

6. A computer communicably connected to a conveyance system including a plurality of conveyance modules each having a conveyance means for conveying an article, the computer comprising an arithmetic device, a storage device connected to the arithmetic device, and a communication device connected to the arithmetic device, wherein the arithmetic device acquires interconnection information regarding connection between the conveyance modules of each of the plurality of conveyance modules forming a conveyor line from the conveyance system via the communication device, and controls the conveyance system on a basis of a plurality of pieces of the interconnection information, wherein the interconnection information includes identification information of a first conveyance module, identification information of a second conveyance module connected to the first conveyance module, a connection direction of the second conveyance module to the first conveyance module, and a connection direction of the first conveyance module to the second conveyance module, and wherein the storage device stores conveyance module basic information for managing a structure of the plurality of conveyance modules, and the arithmetic device generates conveyor line model information for managing a structure of the conveyor line constructed in the conveyance system using the conveyance module basic information and the plurality of pieces of interconnection information, and stores the conveyor line model information in the storage device.

7. A computer communicably connected to a conveyance system including a plurality of conveyance modules each having a conveyance means for conveying an article, the computer comprising an arithmetic device, a storage device connected to the arithmetic device, and a communication device connected to the arithmetic device, wherein the arithmetic device acquires interconnection information regarding connection between the conveyance modules of each of the plurality of conveyance modules forming a conveyor line from the conveyance system via the communication device, and controls the conveyance system on a basis of a plurality of pieces of the interconnection information, wherein the interconnection information includes identification information of a first conveyance module, identification information of a second conveyance module connected to the first conveyance module, a connection direction of the second conveyance module to the first conveyance module, and a connection direction of the first conveyance module to the second conveyance module, and wherein the storage device stores conveyance module basic information for managing a structure of the plurality of conveyance modules, and the arithmetic device generates a conveyance route in the conveyor line constructed in the conveyance system using the conveyance module basic information and the plurality of pieces of interconnection information, and stores information about the conveyance route in the storage device.

8. The computer according to claim 7, wherein
basic control logic that is a basic control method of the conveyance means is set up in each of the plurality of conveyance modules,
the arithmetic device
identifies the conveyance module that requires additional control logic to be set up in addition to the basic control logic on a basis of the information about the conveyance route,
generates special control logic set up in the conveyance module identified, and
sets up the special control logic in the identified conveyance module.

* * * * *